Oct. 21, 1952 — J. E. B. SHAW — 2,614,562
BLOOD TRANSFUSION FILTER UNIT
Filed March 30, 1950

Inventor.
John E. B. Shaw.
by McKnight and Comstock
Attorneys.

Patented Oct. 21, 1952

2,614,562

UNITED STATES PATENT OFFICE 2,614,562

BLOOD TRANSFUSION FILTER UNIT

John E. B. Shaw, Chicago, Ill.

Application March 30, 1950, Serial No. 152,805

6 Claims. (Cl. 128—214)

My invention relates to a blood transfusion apparatus.

Among the objects of my invention is to provide a filter unit for blood transfusions in which the filtering is done within the container prior to the blood leaving the same, and which filter is protected from corrosion.

It is desirable to filter the blood while it is still in the container, and before it enters the tube line. There is greater likelihood of the blood clogging in the narrow tube line, where the clogging cannot be dislodged by shaking.

It is also desirable to have the filter built into the container so that the filtering will be sterile, immediate and uniform. Time is saved an attendant searching for a suitable filtration apparatus and sterilizing and fitting the same. My unit provides for efficiency and economy.

Since sodium citrate or the like is placed in the container as an anti-coagulant to prevent clotting of the blood, and as sodium citrate and the like have an extremely corrosive effect on the metal mesh of blood filters, I provide a protective cover of nylon, glass or other like corrosive resistant material for my blood filter to protect the same and means for removing the cover immediately prior to use of the container for a blood transfusion, without removing the sealing plug from the container.

My invention also contemplates such other objects, advantages and capabilities as will later more fully appear and which are inherently possessed by my invention.

A primary object of my invention is to provide a construction so formed that the cover may be removed by the insertion of the ordinary drip adapter into the solution opening in the plug.

While I have shown in the accompanying drawing a preferred form of my invention, yet I wish it understood that the same is susceptible of modification and change without departing from the spirit of my invention as defined in the claims asserted in this application.

Figure 1:
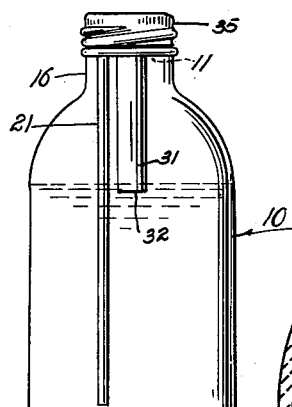
Figure 3:
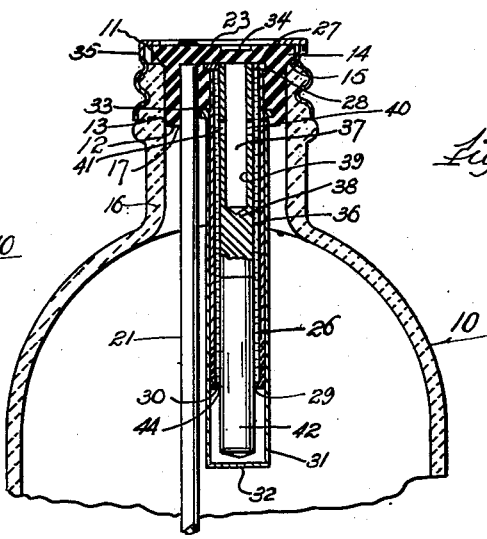
Figure 2:
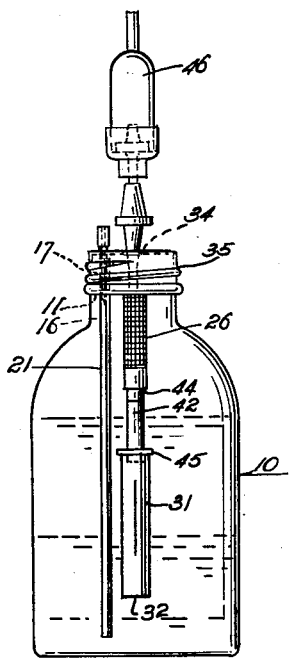
Figure 4:
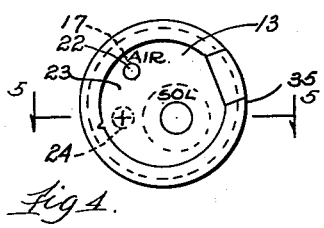
Figure 5:
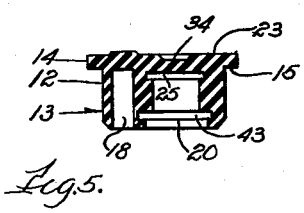
Figure 6:
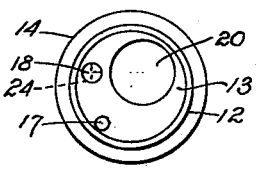
Figure 7:
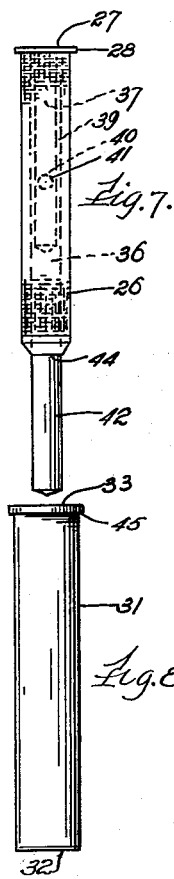
Figure 8:
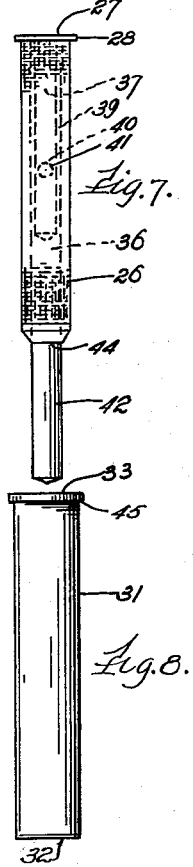

Referring to the drawing, Fig. 1 is a side elevational view of my bottle filled; Fig. 2 is an elevational view of my bottle with the adapter shown in position; Fig. 3 is an enlarged detailed sectional view of the assembled parts; Fig. 4 is a top plan view of the cap and plug; Fig. 5 is a detailed sectional view of the plug on line 5—5 of Fig. 4; Fig. 6 is a bottom plan view of the plug; Fig. 7 is a detailed view of the filter and tube and Fig. 8 is a side elevational view of the cover.

The embodiment selected to illustrate my invention comprises a bottle 10 formed of glass or any other suitable material, having an open mouth 11.

Extending within the open mouth 11 is the body portion 12 of a plug 13 of a pierceable rubber or the like. A flange 14 at the upper part of the body portion 12 provides a rim 15 which rests on top of the walls 16 of the bottle 10 surrounding the mouth 11.

Three spaced openings 17, 18 and 20 extend upwardly from the bottom of the body portion 12, but end short of extending therethrough. The smallest of the openings 17 receives and holds by friction grip the upper end of air tube 21, preferably made of glass. A slight depression 22 marked "Air" is positioned in the top 23 of plug 12 on a line with opening 17 and is adapted to receive a needle, which when forced through plug 13 provides air for air tube 21.

The next larger opening 18 is directly below an indication 24, preferably a circle containing an X marked in top 23 to direct a needle which when passed through plug 13 extends into opening 18 to permit blood and anti-coagulant such as sodium citrate, or other liquid to be passed into container 10. When the needle is withdrawn, plug 13 is substantially self-sealing.

The largest opening 20 has at its upper end a transverse radial opening 25, and spaced downwardly therefrom another transverse radial opening 43.

A blood filter 26 formed of fine metal or plastic mesh is preferably cylindrical in form, and has an open upper end 27 with an out-turned flange 28. The open upper end 27 of filter 26 is anchored within opening 20 of plug 13, with flange 28 fitting within transverse radial opening 25. At the bottom open end 29 of filter 26 is pierceable cap 30 formed of rubber or the like. Cap 30 may also be formed of metal with an opening 44 in the bottom.

A tube 36 has an open top 37, a closed bottom 38 and closed side walls 39 with opposite openings 40 and 41. Attached to or integral with the closed bottom 38 and extending therebeyond is a rod 42. The tube 38 is positioned within filter 26 so that the upper end of tube 38 is substantially flush with the tube of filter 26 and the lower end of rod 42 extends through pierceable rubber cap 30, or opening 44 in metal cap 30.

A cover 31 of nylon, glass or other suitable material, substantially resistant to sodium citrate or the like, having a closed bottom 32 and an open top 33 removably and spacedly covers filter 26, with its upper portion extending into opening 20, and held therein by friction grip with the walls of the plug 13 surrounding opening 20, and a circumferential flange 45 at its upper end engaging transverse radial opening 43.

In top 23 of plug 13 a depression 34 is positioned immediately above opening 20 and marked SOL.

A cap 35 is screw threaded to the neck of the container.

When a blood transfusion is to be given, the pointed bottom of the adapter of the ordinary Murphy drip tube is placed through opened depression 34 and through plug 13 against the top 37 of tube 36, moving tube 36 downwardly so that the bottom of rod 42 engages the closed bottom 32 of cover 31. Cover 31 is moved downwardly by rod 42 and forced out of opening 20 into the liquid in container 10 where cover 31 drifts to the bottom of the container. Filter 26 is then free to act as a filter.

A needle is placed in depression 22 and forced through plug 13 into air tube 21 for providing air. Another needle with tubing is attached to the Murphy drip tube to receive the flow of blood from the container 10 when the same is inverted.

Having thus described my invention, I claim:

1. A blood transfusion unit comprising a container adapted to hold blood and an anti-coagulant corrosive to metal, said container having an opening, a pierceable plug removably closing said opening, said plug having an opening in its bottom portion, a filter of metal mesh extending into the opening in said plug and anchored within said plug within said container, a bottom cap attached to the lower end of said filter, a tube having an open top, side walls with openings therein, a closed bottom and a rod extending below said closed bottom of said tube positioned within said filter with its open top substantially flush with the open top of said filter, and said rod extending through the bottom cap of said filter, a cover of material substantially resistant to the corrosive effect of the anti-coagulant, said cover having an open upper end and a lower closed end, said cover spaced around said filter and having its upper end extending within the opening in said plug and removably held therein, said plug adapted to be pierced immediately above said filter by the adapter point of the conventional drip tube, said tube adapted to be moved downwardly against said cover for forcing the cover out of the opening in said plug for exposing said filter, said plug adapted to be pierced by an air supply member to permit the flow of liquid from the container out through the drip tube after the liquid in said container has been filtered by said filter before leaving said container and passing into the adapter.

2. A blood transfusion unit comprising a container adapted to hold blood, said container having an opening, a pierceable plug removably closing said opening, said plug having an opening in its bottom portion, a filter extending within the opening in said plug and anchored therein within said container, a cover surrounding said filter and attached to said plug within said container, a tube positioned within said filter, said tube having an extension extending through said filter, said plug adapted to receive the adapter point of a conventional drip tube immediately above said filter, said tube adapted to be moved downwardly against said cover for forcing the cover off said filter, said plug adapted to be pierced by an air supply member, so that the blood in said container will flow and will be filtered by said filter before leaving said container and passing into the drip tube.

3. A blood transfusion filter unit comprising a container adapted to hold blood and an anti-coagulant corrosive to metal and having an opening, a plug removably closing said opening, a mesh filter attached to said plug within said container, a cover of material substantially resistant to the corrosive effect of the anti-coagulant, said cover removably attached to said plug within said container, a tube having an open top, side walls with openings therein, a closed bottom, and an extension extending below said closed bottom, said tube positioned within said filter, and said extension extending through said filter, said plug adapted to receive the adapter point of a conventional drip tube immediately above said filter, said tube adapted to be moved downwardly against said cover for forcing the cover off said filter, said plug adapted to be pierced by an air supply member, so that blood in said container will flow and will be filtered by said filter before leaving said container and passing into the drip tube.

4. In a blood transfusion unit, a container adapted to hold blood and an anti-coagulant corrosive to certain materials, said container having an opening, a pierceable plug removably closing said opening, a filter attached to said plug and positioned within said container, a cover removably attached to said plug and positioned within said container to protect said filter against the corrosive effect of the anti-coagulant, a cover ejector tube positioned within said filter adjacent said cover, said plug adapted to receive the adapter point of a conventional drip tube and said cover ejector tube adapted to receive the adapter point of a conventional drip tube whereby said cover ejector tube is moved against said cover and said cover is moved away from said filter.

5. In a blood transfusion unit, a container adapted to hold blood and an anti-coagulant corrosive to certain materials, said container having an opening, a pierceable plug removably closing said opening, a non-collapsible filter attached to said plug and positioned within said container, a cover removably attached to said plug and positioned within said container to protect said filter against the corrosive effect of the anti-coagulant, a cover ejector tube positioned within said filter adjacent said cover, said plug adapted to receive the adapter point of a conventional drip tube, said cover ejector tube adapter to be moved by the adapter point of a conventional drip tube against said cover for moving said cover away from said filter.

6. In a blood transfusion unit, a container adapted to hold blood and an anti-coagulant corrosive to certain materials, a non-collapsible filter positioned within said container, a cover removably positioned around said filter to protect the filter against the corrosive effect of the anti-coagulant, a tube positioned within said filter, said tube adapted to receive means for moving said cover away from said filter.

JOHN E. B. SHAW.

REFERENCES CITED

The following references are of record in the file of this patent:

UNITED STATES PATENTS

| Number | Name | Date |
| --- | --- | --- |
| 2,222,123 | Schwab | Nov. 19, 1940 |
| 2,464,496 | Gee | Mar. 15, 1949 |
| 2,470,943 | Page | May 24, 1949 |
| 2,473,153 | Lager | June 14, 1949 |